Patented Sept. 5, 1950

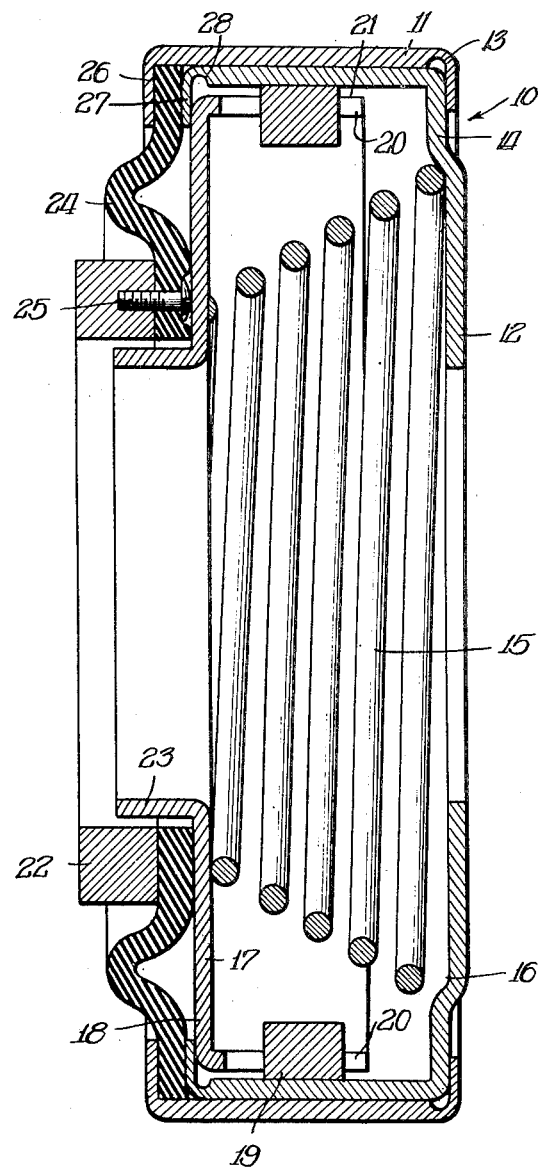

2,521,102

UNITED STATES PATENT OFFICE 2,521,102

SEAL

Rudolph J. Vedovell, Kenilworth, Ill., assignor to Chicago Rawhide Manufacturing Company, Chicago, Ill., a corporation of Illinois Application January 19, 1946, Serial No. 642,230

2 Claims. (Cl. 288—3)

This invention relates to an end thrust or face seal of the radial diaphragm type and it is an object thereof to provide such a seal which is of simplified and extremely compact, self-contained character, enabling great speed and ease of assembly.

Other more specific objects and advantages of the invention will be apparent to those skilled in the art upon a full understanding of the improved structure herein described.

In the drawings, the figure is an enlarged view in longitudinal vertical section, illustrating structural details of a seal incorporating the invention.

This invention relates to an end thrust or face seal of the diaphragm type, wherein the diaphragm is disposed in a radial plane, secured to a face sealing ring at the inner periphery thereof and to an annular support at the outer periphery and comprises various structural features directed to the general improvement and simplification of seals of this type.

Referring to the figure, the reference numeral 10 in general designates a casing wherein the further components of the seal are enclosed, this casing being fabricated of an outer sleeve-like ring 11 and an inner, annular, cup-like rear element 12 fixedly telescoped in said ring. In fabricating and assemblying the ring and element 12, the former is turned in a lathe at 13 on the rear edge or margin thereof to facilitate bending or spinning of said margin rearwardly around the adjacent, radially inwardly extending flange 14 of the element 12. Said flange serves as an abutment for a conical coil thrust spring 15 and to that end has a slight circular offset 16 at its center to provide a circular seat for the enlarged end of the spring. At its other end spring 15 abuts the rear surface of the radial flange 17 of a dished floating pressure ring 18. Relative rotation of ring 18 relative to the casing 10 is prevented by the provision of a plurality of radially extending lugs 19 welded or otherwise secured to the inner element 12 of said casing, which lugs extend into slots 20 formed in a rearwardly extending annular flange 21 on ring 17. Accordingly, free relative axial movement of the members is permitted while relative rotation thereof is effectively restrained.

At its forward side the radial flange 17 of dished ring 18 provides axial thrust for an annular face seal ring 22 of leather, carbon or other appropriate material, being provided with a reduced annular neck 23 which extends concentrically within said ring 22 for ease of assembly. Ring 22 is floatingly supported on a flexible, radially extending, centrally apertured, flexible diaphragm 24 of leather, rubber or synthetic rubber being secured to the inner periphery of said diaphragm by screws 25. At its outer periphery said diaphragm is clamped between annular, radially inwardly extending shoulders 26, 27 on outer casing ring 11 and inner casing element 12, respectively. In order to facilitate assembly, material of the inner element 12 is removed at 28, similar to the turned margin 13.

In operation, the face seal ring 22 is thrust axially by the thrust ring 18, the diaphragm being flexible to permit free axial movement. Ring 22 is properly centered by the diaphragm. Axial movement of thrust ring 18 is limited by engagement of its flange 17 with the rear of the radially inturned margin 27 on the inner casing element 12. The diaphragm is frictionally engaged at its rear surface by flange 17 to assist in resisting twisting moment arising from its face sealing engagement with a relatively rotatable surface. However, over and above this assistance the diaphragm is amply strong in torque to resist objectionable racking or twisting, furnishing a very desirable self-aligning and self-compensating floating mount for the face sealing ring 22.

This seal construction is very simple, compact and inexpensive. It is entirely self-contained and may be applied as desired with a minimum of time and trouble.

What I claim is:

1. In a seal, a hollow annular outer casing comprising a sleeve-like outer member and an annular inner member concentrically telescoped in said outer member, a flexible diaphragm extending radially of said members and secured at its outer periphery therebetween adjacent one axial side thereof, said members having radially inturned margins adjacent said axial side in gripping engagement with said outer diaphragm periphery and one of said members being shaped at its opposite axial side to provide an inturned radial flange, said diaphragm having a sealing member secured thereto in radially spaced relation to said outer periphery, and resilient thrust means in said casing including an annular thrust member provided with a forwardly facing thrust surface in axially abutting, slidable engagement with said diaphragm, and an axial thrust spring acting between said thrust member and said radial flange to urge said diaphragm and sealing member axially under resilient thrust, the thrust surface of said member radially overlapping and being axially engageable with the inturned margin of said inner member to limit its axial movement.

2. In an entirely self-contained seal, an axially extending tubular casing, a flexible, annular, radially extending diaphragm secured at its outer periphery to said casing adjacent one axial side thereof, said casing having a fixed, radially extending flange adjacent the opposite axial side thereof, said diaphragm having a sealing member disposed thereon in radially inwardly spaced relation to said outer periphery, an annular thrust member mounted for axial shifting movement in said casing, means preventing relative rotation of said casing and thrust member, said thrust member being provided with a forwardly facing thrust surface in axially abutting, slidable engagement with said diaphragm, enabling relative floating of said thrust member and sealing member in operation in a plane transverse the axis of the seal, and a thrust spring in said casing acting axially between said thrust member and said radially extending casing flange, said thrust member and casing being axially engageable to limit axial shifting of the thrust member by said spring.

RUDOLPH J. VEDOVELL.

REFERENCES CITED

The following references are of record in the file of this patent:

UNITED STATES PATENTS

| Number | Name | Date |
|---|---|---|
| 1,972,077 | Eberhard | Sept. 4, 1934 |
| 2,077,881 | Gits | Apr. 20, 1937 |
| 2,311,494 | Vedovell | Feb. 16, 1943 |
| 2,322,835 | Dornhofer | June 29, 1943 |
| 2,363,110 | Krug | Nov. 21, 1944 |
| 2,377,452 | Reynolds | June 5, 1945 |

FOREIGN PATENTS

| Number | Country | Date |
|---|---|---|
| 120,837 | Great Britain | of 1918 |